United States Patent [19]

Takehara

[11] Patent Number: 4,480,326
[45] Date of Patent: Oct. 30, 1984

[54] STYLUS HAVING A CONDUCTIVE CARBON LAYER

[75] Inventor: Hideaki Takehara, Fujisawa, Japan

[73] Assignee: Victor Company of Japan, Limited, Japan

[21] Appl. No.: 514,342

[22] Filed: Jul. 15, 1983

Related U.S. Application Data

[62] Division of Ser. No. 326,391, Dec. 1, 1981, Pat. No. 4,420,675.

[30] Foreign Application Priority Data

May 26, 1981 [JP] Japan .................................. 56-79889

[51] Int. Cl.³ ........................ G11B 11/00; G11B 9/06
[52] U.S. Cl. ..................................... 369/173; 369/126
[58] Field of Search ...................... 369/173, 126, 151

[56] References Cited

U.S. PATENT DOCUMENTS

| | | | |
|---|---|---|---|
| 4,105,213 | 8/1978 | Owaki et al. | 369/173 |
| 4,212,471 | 7/1980 | Nishiwaki et al. | 369/173 |
| 4,357,699 | 11/1982 | Takehara et al. | 369/173 |
| 4,409,712 | 10/1983 | Takehara | 369/173 |
| 4,420,675 | 12/1983 | Takehara | 219/121 LM |

FOREIGN PATENT DOCUMENTS

| | | | |
|---|---|---|---|
| 54-41881 | 8/1978 | Japan . | |
| 125549 | 9/1980 | Japan | 369/126 |
| 44130 | 4/1981 | Japan | 369/126 |
| 44131 | 4/1981 | Japan | 369/126 |
| 140535 | 11/1981 | Japan | 369/173 |
| 2099201 | 12/1982 | United Kingdom | 369/126 |

*Primary Examiner*—Steven L. Stephan
*Attorney, Agent, or Firm*—Lowe, King, Price & Becker

[57] ABSTRACT

A diamond body is irradiated with a pulsed laser beam in an environment containing a small amount of oxygen to convert the carbon atoms of the diamond into a conductive layer which serves as a stylus electrode. The conversion process may be preceded by a process in which the diamond body is placed in an environment containing a large amount of oxygen and irradiated with the laser beam to carbonate the irradiated area to form a groove so that the electrode can be formed on the bottom of the groove. This prevents the electrode from being damaged when the stylus pitches as it moves on the record surface.

2 Claims, 8 Drawing Figures

STYLUS HAVING A CONDUCTIVE CARBON LAYER

This is a division of application Ser. No. 326,391, filed Dec. 1, 1981, now U.S. Pat. No. 4,420,675 filed Dec. 13, 1983.

BACKGROUND OF THE INVENTION

The present invention relates to a method for making a record stylus for use in reproducing signals from a capacitance record and to the stylus manufactured by the method, and in particular to a method for forming an electrode on a surface of a diamond body.

Pickup styluses for use with capacitance disk records comprise a diamond body and an electrode attached thereto to read an information signal from each track of the record by sensing its geometric surface variations as variations is capacitance. The electrode is conventionally formed by vacuum deposition, sputtering, or ion plating a conductive material such as hafnium or titanium. Since such conductive material is chemically different from the underlying material, the electrode is only physically attached to the underlying body, resulting in an electrode having a tendency to separate therefrom during use due to friction with the record surface. Another conventional method involves ion implantation. However, due to the strong bonding between carbon atoms that constitute the diamond, it is difficult to inject a sufficient amount of ions to provide a conductive layer.

Another problem arises from the fact that the stylus has a tendency to swing, or pitch as it moves along the track and this causes the electrode to frictionally contact with the record surface at an angle thereto so that the lowermost end of the electrode is partially lost by the friction.

Co-pending U.S. patent application Ser. No. 268,888 filed June 1, 1981 now U.S. Pat. No. 4,409,712 issued Oct. 18, 1983 and assigned to the same assignee as the present invention, discloses a method whereby a diamond body is heated in a virtual vacuum or an inert-gas containing environment with a small amount of oxygen to convert the carbon molecules of the surface area into a layer of conductive carbon to serve as the electrode. Since the conductive carbon layer is integral with the diamond body, the electrode is not separable therefrom and is resistant to wear.

However, the prior method has an inherent difficulty in forming the diamond body into the desired shape and dimensions suitable for a pickup stylus. Since the electrode is usually formed in a process prior to the shaping process, the surface of the diamond body is entirely surrounded by the conductive layer of which a substantial portion must be removed to form the electrode. Since the conductive carbon layer is formed integrally with the underlying diamond body, it is a time-consuming affair to remove the conductive carbon layer.

SUMMARY OF THE INVENTION

According to the present invention, a diamond body is placed in an environment having a lowered oxygen content and a predetermined area of the body is bombarded with a beam of heat producing energy to locally heat the carbon atoms of the diamond so that they are converted to a conductive layer to serve as an electrode of the stylus. The diamond body may be positioned in an evacuated chamber containing a small amount of oxygen or in an inert-gas chamber containing a small amount of oxygen. The conversion of surface area to conductive carbon may be preceded by a process in which the diamond body is placed in an environment of an increased oxygen content and the heat producing beam is used to carbonize a portion of the diamond to form a groove. The electrode is formed by directing the beam to the bottom of the groove so that the electrode is positioned inwardly of the trailing edge of the pickup stylus. This prevents the electrode from being damaged even when the stylus pitches on the record.

The formation of a groove and a conductive carbon layer can be carried out in a single process within the normal atmospheric environment. However, to ensure a conductive layer of high conductivity it is preferred that the conductive layer-forming process be performed in a vacuum containing a small amount of oxygen or an inert-gas containing environment with a small amount of oxygen. The amount of oxygen contained in such an environment, as expressed by partial pressure, is preferably 1/5 of the total pressure of the environment. The present invention permits the diamond body to be subjected to a lapping process whereby the body is shaped into a desired stylus form either prior to or after the formation of the electrode.

BRIEF DESCRIPTION OF THE DRAWINGS

The present invention will be described in further detail with reference to the accompanying drawings, in which.

DETAILED DESCRIPTION

Figure 1A:
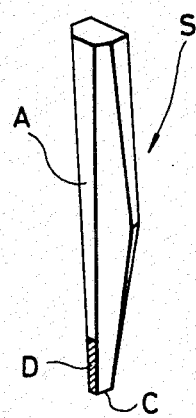
FIGS. 1a and 1b are illustrations of typical examples of a diamond body prior to the formation of a stylus electrode.
Figure 1B:
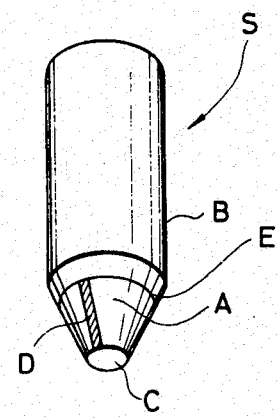

Referring now to FIG. 1a, there is shown a typical example of stylus body S which is in the form of a multi-faced diamond having a narrow flat surface A. Another example is shown in FIG. 1b in which the stylus body S is in the shape of a cylinder B formed of titanium to which a truncated cone A of diamond is soldered by a layer E of silver. In either example, the lower end of the body may be cut to form a contact face C which makes contact with several tracks of grooveless capacitance records and a stylus electrode to be formed on an area marked D.

Figure 2:
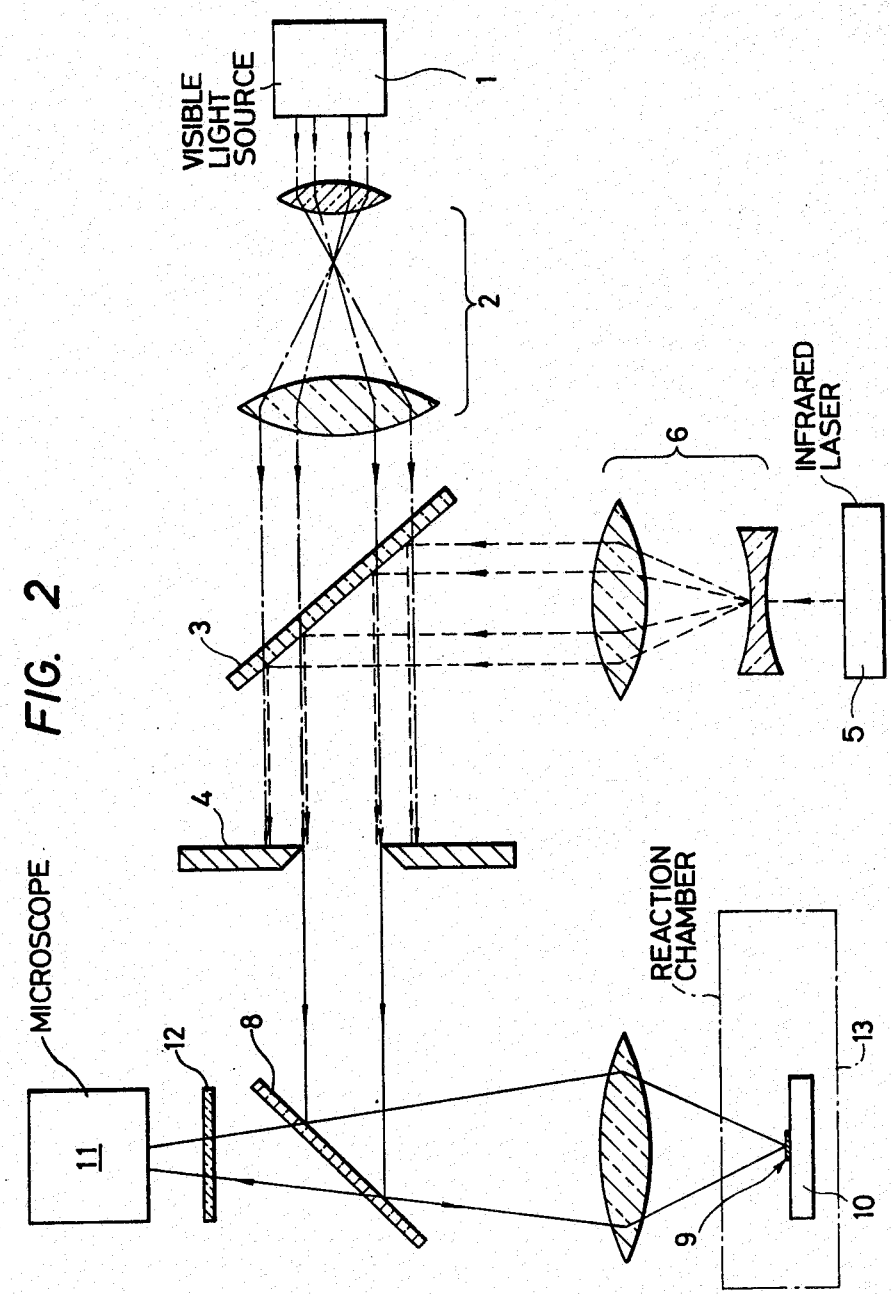
FIG. 2 is an illustration of an arrangement for forming a stylus electrode using an infrared laser beam having an elongated cross-section.

Referring to FIG. 2, there is shown an infrared laser beam apparatus is shown. The apparatus comprises a visible light source 1, a lens system 2 for forming a collimated beam as indicated by chain-dot lines. In the path of the visible light beam is located a half-silvered mirror 3 and a slit 4 for shaping the cross-section of the beam into an elongate form corresponding to the area D of the stylus body S. A pulsed infrared laser beam, indicated by broken lines, is directed from a source 5, shaped into a beam of suitable cross-section by means of a lens system 6 and reflected on the half-silvered mirror 3 to the slit 4 where it is shaped into the same cross-section as the visible light beam. The beam passing through the slit 4 is split by a half-silvered mirror 8 into a beam directed downward to a stylus body 9 located on a workplate 10 and a beam directed upwards to a microscope 11 through a filter 12 which allows passage of the visible light while rejecting the infrared light. The infrared laser beam thus shaped by slit 4 has a beam cross-section of 1.5 micrometers × 20 micrometers. The stylus body S is located within a reaction chamber 13 which is evacuated to a level in a range between $3 \times 10^{-2}$ Torr and $200 \times 10^{-2}$ Torr so that it contains a small amount of oxygen whose partial pressure preferably ranges from $(3/5) \times 10^{-2}$ Torr to $40 \times 10^{-2}$ which is 1/5 of the total pressure of the reaction chamber 13.

Prior to the emission of the laser beam, the visible light source 1 is activated to direct its beam to locate the area D on which the infrared laser beam is to be impinged. By moving the workplate 10 while viewing through the microscope 11 the operator is able to pinpoint the area D on the stylus body. The laser beam source 5 is then activated for a duration of 20 nanoseconds so that the emitted beam has an energy of 0.5 millijoules which is sufficient to produce heat that alters the carbon atoms of the visibly marked area to a conductive state. The laser impinged area is thus converted into a conductive layer which serves as a stylus electrode. The laser beam may be repeatedly directed to the diamond body until a desired value of conductivity, or sheet resistance is attained. For example, when the diamond body was irradiated twice with the laser beam just described, a sheet resistance of from 300 ohms to 400 ohms was attained.

Use of a narrow infrared laser beam could also be used instead of the shaped beam. In that instance a beam deflection device is required to scan the desired area of the stylus body.

Figure 3:
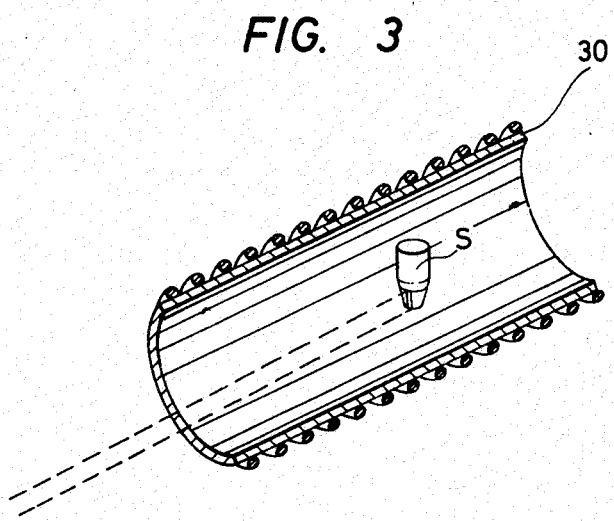
FIG. 3 is a schematic illustration of a further arrangement in which the diamond body is placed in an electric furnace for preheating purposes.

FIG. 3 illustrates another preferred arrangement in which an electric furnace 20 is additionally placed in the reaction chamber 13 to preheat the stylus body to a tmeperature of from 650° C. to 750° C. This preheating process serves to bring the surface carbon atoms into a state which is readily convertible to a conductive state and permits the use of a lower energy laser beam.

Scoring tests indicate that the conductive layer is not separable from the underlying body. It is found that there is a smooth transition between the diamond body and the surface conductive layer which accounts for the strong bonding with which they are tied together.

The same results were obtained when the diamond body was treated in an environment containing an inert gas containing a small amount of oxygen having the same partial pressure as described above.

Figure 4:
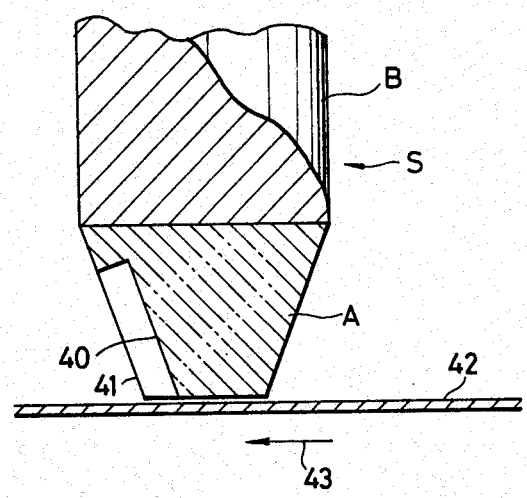
FIG. 4 is an illustration of a grooved record stylus in an operating position with respect to a capacitance record.

The problem associated with the pitching of the stylus is overcome by forming a groove 40 in the truncated conical diamond body A of the stylus as illustrated in FIG. 4 and successively forming a conductive layer on the bottom of the groove in a manner identical to that described above so that the electrode is located inwardly of the trailing edge 41 of the body S as it moves over the capacitance disk record 42 spinning in a direction indicated by the arrow 43. The electrode is thus protected from damage by contact with the record surface even when the stylus is pitched along the track.

According to the present invention, the groove 40 is formed by placing the stylus 9 in an atmospheric environment, or raising the pressure inside the reaction chamber 13 to thereby increase the oxygen content. Under this condition a pulsed laser beam is directed to the area marked by the visible light beam. Due to the increase in oxygen quantity, the carbon atoms are carbonated in the beam-impinged area where the groove 40 is formed. A groove with a depth of approximately 2000 to 3000 Angstrom is created with an area of approximately 1 micrometer × 20 micrometers which may differ from the cross-sectional area of the laser beam because of the concentration of thermal distribution on the center area of the beam irradiated surface. It is found that with the groove forming process, the carbon atoms of the groove's bottom have been converted to a conductive layer having a sheet resistance of 4 kilo-ohms per 2-millimeter square which may be appropriate for certain applications.

Figures 5A, 5B, 5C:
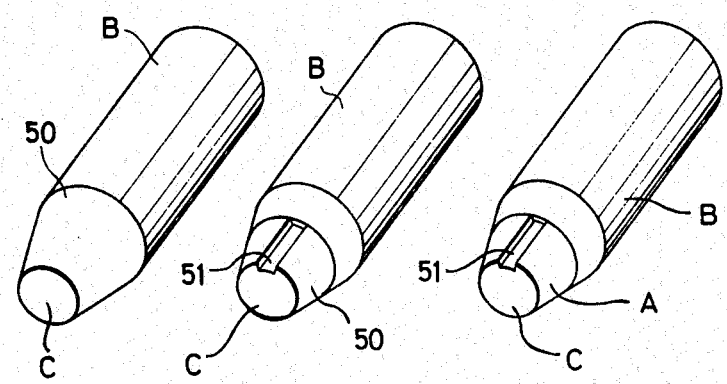
FIGS. 5a, 5b and 5c are illustrations useful for describing the method of forming a groove on the diamond stylus.

The truncated conical diamond body is usually polished so that the surface irregularities do not exceed one-half of the minimum wavelength or bit spacing of the signal recorded on the track. This ensures that the electrode formed on the polished surface has the same surface irregularities as the underlying body so that even a single bit of recorded signal may not be lost. Because of this polished surface, a substantial portion of the incident laser energy could be lost by penetration into or reflection from the surface. In order to render the diamond surface absoptive of laser energy, it is preferable to form a light absorbing layer 50, either conductive or nonconductive, over the truncated conical portion as shown in FIG. 6a by sputtering, vacuum evaporation or any other suitable techniques. The laser beam is impinged on the absorbing layer 50 to turn the laser energy into heat. After a groove 51 is formed (see FIG. 5b), the light absorbing layer 50, if formed of a conductive material, is completely removed as shown in FIG. 5c. If the absorbing layer 50 is formed of a nonconductive material, the etching process is not necessary since such layer will have no adverse effect on the performance of the stylus.

What is claimed is:

1. A record stylus for use in detecting signals recorded as geometric variations on a capacitance disk, comprising:

a diamond body having a contact surface for making contact with said disk and a groove formed on a side surface thereof extending from said contact surface; and a conductive layer formed on the bottom surface of said groove, said conductive layer being composed of the carbon constituent of a surface portion of the diamond body formed by a beam of heat-producing energy in oxygen containing environment.

2. A method as claimed in claim 1 wherein the heat-producing energy is an infrared laser beam.

* * * * *

UNITED STATES PATENT AND TRADEMARK OFFICE
CERTIFICATE OF CORRECTION

PATENT NO. : 4,480,326

DATED : October 30, 1984

INVENTOR(S) : Hideaki Takehara

It is certified that error appears in the above-identified patent and that said Letters Patent is hereby corrected as shown below:

Claim 9 should read as follows:

9. A record stylus as claimed in Claim 8 wherein the heat producing energy is an infrared laser beam.

Signed and Sealed this

Ninth Day of April 1985

[SEAL]

*Attest:*

DONALD J. QUIGG

*Attesting Officer*     *Acting Commissioner of Patents and Trademarks*